2,941,000
PREPARATION OF MIXED ANHYDRIDES OF LOWER ALKANOIC ACIDS AND PYROBORIC ACID

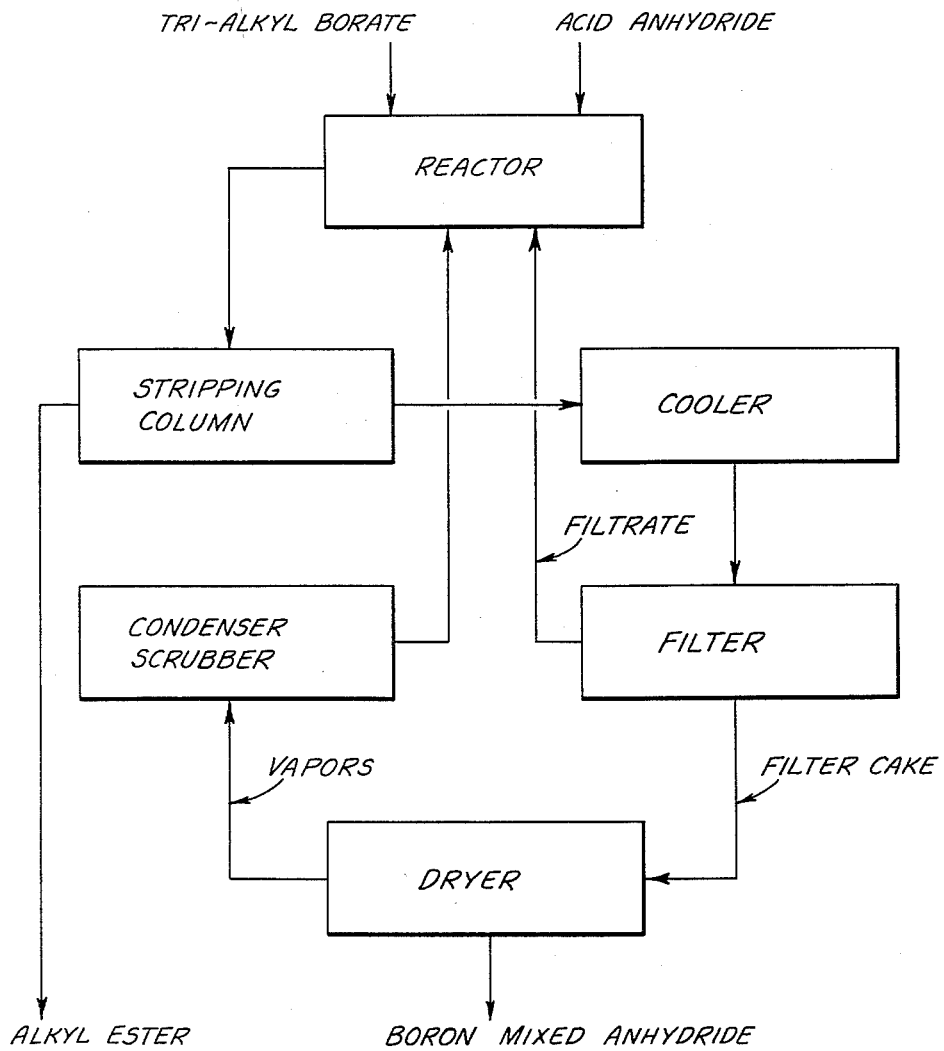

Frank H. May and Vladimir V. Levasheff, Whittier, Calif., assignors to American Potash & Chemical Corporation, a corporation of Delaware Filed Mar. 24, 1958, Ser. No. 723,547

12 Claims. (Cl. 260—545)

This is a continuation-in-part of our application Serial No. 538,878, filed October 5, 1955, now abandoned.

This invention relates to the manufacture of the mixed anhydrides of boric acid and various carboxylic acids, particularly boron acetate, $C_8H_{12}O_9B_2$; this material has also been designated as boron pyroacetate and boron tetracetate.

It has been proposed to make boron pyroacetate by reacting boric acid and acetic anhydride. While this reaction appears quite simple and direct when represented in its simplest form:

(1) $2B(OH)_3 + 5(CH_3CO)_2O$
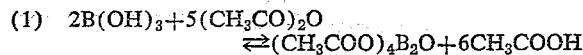
$\rightleftarrows (CH_3COO)_4B_2O + 6CH_3COOH$ it is not in fact so when considered as it actually proceeds:

(2) $(3H_2O \cdot B_2O_3) + 2(CH_3CO)_2O$
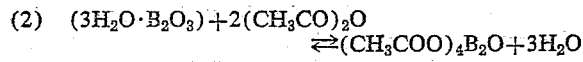
$\rightleftarrows (CH_3COO)_4B_2O + 3H_2O$ (3) $3H_2O + 3(CH_3CO)_2O \rightleftarrows 6CH_3COOH$ 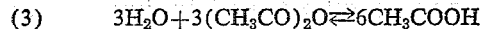

because difficulty is experienced in causing reaction (1) to go to completion.

We have found that this difficulty can be avoided and the reaction can be carried to completion under completely anhydrous conditions by using a borate ester as the boron source, reacting this with a suitable anhydride:

(4) $2B(OR)_3 + 5(R'CO)_2O$
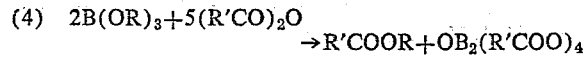
$\rightarrow R'COOR + OB_2(R'COO)_4$ where R is any lower alkyl, e.g., methyl, ethyl, propyl, butyl, or amyl group, and $(R'CO)_2O$ is an anhydride of a saturated monobasic carboxylic acid, e.g., the anhydride of acetic acid, propionic acid, the butyric acids, the valeric acids, caproic acid, heptanoic acid and caprylic acid. Thus, R' is an unsubstituted alkyl group having between one and seven carbons.

The reaction is relatively simple and easy to control, the mixed anhydride of boric acid and the carboxylic acid being obtained as a crystalline material which can be separated by filtration. Further, the crystalline product can be washed with additional esters in which the mixed anhydride has a low solubility to give a product of high purity.

In the drawing, the single figure is a schematic flow sheet representing the basic process utilized in producing the mixed anhydride from the acid anhydride and a borate ester. The process is preferably practiced on a continuous basis, the trialkyl borate and the acid anhydride being fed continuously into the reactor. Material is removed continuously from the reactor to a stripping column, from which the alkyl ester of the acid is removed as distillate. The stripped liquor, the tower bottoms, is sent to a cooler and thence to a filter where the crystallized mixed anhydride is recovered. The filtrate is returned to the reactor as is the condensed vapor issuing from the mixed anhydride solids during drying operations.

The practice of the invention will become further apparent from a consideration of the following examples which are set forth by way of illustration and not by way of limitation.

*Example 1.*—About 150–200 grams of recycle filtrate were placed in a five-liter, three-neck flask equipped with glass sealed agitator, an addition funnel, a thermometer, and an eight-inch glass packed distillation column with a variable take-off head. The filtrate was first heated to a gentle reflux and a five-to-two mole ratio mixture of acetic anhydride and methyl borate was then added to the refluxing filtrate at the rate required to maintain a minimum refluxing temperature. Methyl borate is miscible with acetic anhydride at room temperature. A quantity of methyl acetate distillate was collected during the reactants addition step for later use as wash material during filtration of the boron acetate solids. The resulting slurry containing boron acetate solids was held at the reflux temperature for an additional fifteen minutes after all the reactants were added and the final head and pot temperatures noted. The reaction slurry was then cooled with continuous agitation to room temperature. Slow cooling was used to ensure an adequate crystal size of boron acetate solids for the subsequent dry box filtration step. Filtration of boron acetate solids, using Büchner funnels and house vacuum, was carried out in a dry box under nitrogen atmosphere. The wet filter cake was transferred to a desiccator and dried under vacuum at room temperature. The product obtained in this manner analyzed better than 98% boron acetate.

*Example 2.*—A similar procedure was used in the cyclic preparation of boron acetate from ethyl borate and acetic anhydride. The product obtained was comparable to that prepared from methyl borate; ethyl borate is miscible with acetic anhydride at room temperature.

The data accumulated during these preparations of boron acetate are summarized respectively in Tables I and II.

TABLE I

Preparation of boron acetate from methyl borate and acetic anhydride

| Batch No. | 1 | 2 | 3 |
|---|---|---|---|
| Recycle filtrate, gms | 155 | 169.5 | 176 |
| Analysis: | | | |
| Percent B | | | 0.57 |
| Percent OAc | | | 13.59 |
| Mixed feed— | | | |
| Acetic anhydride, gms | 3,291.5 | 3,313.6 | 3,306 |
| Methyl borate, gms | 1,358.2 | 1,406.0 | 1,390 |
| Sp. gr. at 25° C | 1.036 | | 1.041 |
| Temperature at end of feed addition: | | | |
| Head, ° C | 57 | | |
| Pot, ° C | 65 | | |
| Distillage, gms | 789 | 741 | 862 |
| Total slurry, gms | 4,089 | 4,131 | 3,985 |
| Wet cake, gms | 1,847 | 1,944 | 1,800 |
| Cake density, gms./cc | 0.819 | 0.826 | 0.800 |
| Filtrate, gms | ¹2,422 | 1,852 | 1,921.5 |
| Analysis: | | | |
| Percent B | 0.57 | 0.57 | 0.57 |
| Percent OAc | 13.59 | 8.22 | 10.70 |
| Washings, gms | | 453 | 370 |
| Analysis: | | | |
| Percent B | 0.77 | 0.84 | 0.92 |
| Percent OAc | 13.77 | 8.65 | 8.96 |
| Dry solids, gms | 1,490 | 1,560 | 1,520 |
| Analysis of composite: | | | |
| Percent B | | 7.87 | |
| Percent OAc | | 85.18 | |
| Purity | | 98.76 | |
| Cold trap material, gms | 358 | 384 | 265 |
| Analysis: | | | |
| Percent B | 0.38 | 0.86 | 0.88 |
| Percent OAc | 3.33 | 2.85 | 3.16 |

¹ Inc. wash.

TABLE II

*Preparation of boron acetate from ethyl borate and acetic anhydride*

| Batch No | 1 | 2 | 3 | 4 |
|---|---|---|---|---|
| Recycle filtrate, gms | 209.5 | 219.4 | 210 | 240 |
| Sp. gr. at 25° C | | | | 0.923 |
| Mixed feed: | | | | |
| Acetic anhydride, gms | 2,517.1 | 2,466 | 2,535.5 | 1,969 |
| Ethyl borate, gms | 1,456.7 | 1,428.1 | 1,490 | 1,153 |
| Sp. gr. at 25° C | | | | 0.983 |
| Temperature at end of feed addition: | | | | |
| Head, °C | 77 | 77 | 77 | 79 |
| Pot, °C | 82 | 85 | 82 | 83 |
| Distillate, gms | | 310 | 400 | 551 |
| Total slurry, gms | 4,162 | 3,799 | 3,828 | 2,805 |
| Filtrate, gms | 2,578 | 2,238 | 2,480 | 1,478 |
| Analysis: | | | | |
| Percent B | | | | 0.46 |
| Percent OAc | | | | 7.54 |
| Washings, gms | 371 | 299 | 492 | 615 |
| Analysis: | | | | |
| Percent B | | | | 0.48 |
| Percent OAc | | | | 6.06 |
| Wet solids, gms | 1,332 | 1,367 | 1,338 | 1,146 |
| Dry solids, gms | 1,195 | 1,180 | 1,115 | 946 |
| Analysis: | | | | |
| Percent B | | 7.97 | | 7.84 |
| Percent OAc | | 84.38 | | 84.12 |
| Purity | | 97.83 | | 97.53 |
| Cold trap materials, gms | | | | 189 |
| Analysis: | | | | |
| Percent B | | | | 0.24 |
| Percent OAc | | | | 3.74 |

*Example 3.*—The reaction between propyl borates and acetic anhydride proceeds according to the following:

$$2B(OC_3H_7)_3 + 5(CH_3CO)_2O \rightarrow 6CH_3COOC_3H_7 + OB_2(CH_3COO)_4$$

The following procedure was used in preparation of boron tetracetate from isopropyl borate and acetic anhydride.

Two moles of isopropyl borate and five moles of acetic anhydride were poured into a distillation flask equipped with a thermometer well. The two liquids did not mix at room temperature. The reaction flask was then connected to a glass packed distillation column equipped with a variable take-off head and heated. Complete mixing occurred at about 85° C. The homogeneous mixture was then refluxed until a minimum head temperature and a minimum pot temperature were obtained. A small amount of the low boiling distillate was then collected to be used as wash liquor, as well as for analysis. A heavy mass of white crystalline solids in a straw yellow liquor was obtained on cooling the pot residue to room temperature. The solids were filtered in a dry box, under nitrogen atmosphere, and washed with a small amount of distillate.

Analysis of dry, free-flowing solids (85.1% acetate, 7.96% B) indicated boron acetate tetramer (7.90% B, percent acetate, 86.25). The distillate was identified as isopropyl acetate.

*Example 4.*—The following reaction rate data were obtained during another preparation of boron tetracetate from acetic anhydride and isopropyl borate:

| | Grams |
|---|---|
| Weight acetic anhydride | 222.1 |
| Weight isopropyl borate ester | 163.7 |

Refluxing:

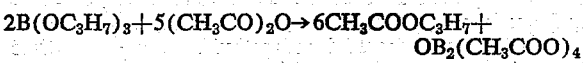

| Pressure, Atm | | | | | |
|---|---|---|---|---|---|
| Head temperature, °C | 95 | 91 | 89 | 89 | 89 |
| Pot temperature, °C | 128 | 124 | 112 | 111 | 110 |
| Time (hours) | 0 | 0.5 | 1.25 | 2.0 | 2.5 |

Distillation:

| | |
|---|---|
| Pressure | Atm. |
| Head temperature, °C | 89 |
| Pot temperature, °C | 110–116 |

*Example 5.*—A quantity of crude boron acetate tetramer was also prepared from acetic anhydride and n-propyl borate. The procedure was essentially similar to the one outlined above.

The product obtained was found to be 6.4 percent B, 72.8 percent acetate, mole ratio

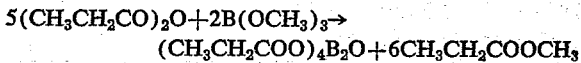

$$\frac{\text{Acetate}}{\text{boron}} = \frac{2.07}{1}$$

*Example 6.*—Preparation of boron propionate was carried out as follows.

For preparation of boron propionate from methyl borate and propionic anhydride, a quantity (130.2 grams) of propionic anhydride (Tech. Grade) and methyl borate (41.6 grams, 99.9 percent $(CH_3O)_3B$) were mixed together in accordance with stoichiometry of the following equation:

$$5(CH_3CH_2CO)_2O + 2B(OCH_3)_3 \rightarrow (CH_3CH_2COO)_4B_2O + 6CH_3CH_2COOCH_3$$

The reaction mixture was contained in a distillation flask fitted with a thermowell and a distillation column filled with protruded steel packing. The column was topped by a total reflux, variable take-off fractionating head serviced with an ice water cooled condenser and protected from atmospheric moisture by a drying tube. The reaction flask was heated until a gentle reflux was obtained (68° C. head temperature, 108° C. pot temperature at atm. pressure).

A quantity (18.5 g.) of distillate was then obtained at atmospheric pressure and 68–79° C. head temperature, 96–103° C. pot temperature. This distillate was found to contain 5.75 percent boron by chemical analysis, while the infrared absorption spectrum analysis showed it to be a mixture of methyl borate and methyl propionate. Distillation was continued at atmospheric pressure and another quantity of distillate (50.0 g.) was obtained at 79–79.5° C. head temperature, 103–115° C. pot temperature. Analysis (both chemical and infrared) showed this distillate fraction to be pure methyl propionate. About 97 grams of pot residue, containing crystalline solids, was obtained at the end of distillation. The resulting reaction slurry was then filtered in a dry box, under atmosphere of nitrogen. The wet product was washed with a small amount of methyl propionate distillate in order to displace the entrained liquor. It was then dried in a vacuum desiccator at room temperature. About 45 grams of dried product was obtained in this manner. The data, pertaining to this preparation are summarized in Table III.

Boron propionate was found to be a white crystalline solid, extremely susceptible to hydrolysis.

Methyl propionate distillate (see Table III, Cut 2) was found to be quite pure, with no detectable methyl borate, alcohol or acid impurities. The boiling point of the Cut 2 distillate (79–79.5° C.) was found to closely correspond to the boiling point of methyl propionate (79.7° C.).

*Example 7.*—Boron-n-butyrate was prepared using n-butyric anhydride as the carboxylic acid anhydride and methyl borate.

Preparation of boron-n-butyrate from methyl borate and n-butyric anhydride was carried out in a 1-liter 3-neck flask fitted with a motor-driven agitator, an addition tube, which was subsequently replaced by a thermometer, and a fractionating tower equipped with a tap water cooled fractionating head.

A quantity of n-butyric anhydride (93 g. Tech. Grade) was placed in the reaction flask and heated with agitation to about 60° C. Methyl borate (24.4 g. of 99.9+% $(CH_3O)_3B$) was then added slowly to the reaction flask from an addition funnel. Upon addition of the methyl borate requirement, as shown in the following equation:

$$5(CH_3CH_2CH_2CO)_2O + 2B(OCH_3)_3 \rightarrow$$
$$(CH_3CH_2CH_2COO)_4B_2O + 6CH_3CH_2COOCH_3$$

the temperature in the reaction flask was found to be 110° C. The reaction mass was further heated to 120° C., at which temperature distillation started at atmospheric pressure. Gentle reflux was obtained at 92° C. head temperature, 120° C. pot temperature. A quantity of distillate (16.5 g.) was collected at atmospheric pressure at 92–102° C. head temperature and 120–130° C. pot temperature. A sample of this distillate was submitted for chemical and for infrared absorption spectrum analysis. It was found to contain 0.19 percent boron, about 0.05 percent of $OCC(CH_2)_2CH_3$ group and about 0.5 percent free methanol. There was no detectable butyric anhydride in the sample.

Distillation was continued at atmospheric pressure and a small quantity (about 5 g.) of distillate was collected at 102–102.5° C. head temperature and 130–145° C. pot temperature. Distillation was then stopped in order to avoid decomposition of pot material. No solids appeared on cooling to room temperature. Distillation was then resumed under reduced pressure to remove more methyl-n-butyrate from the reaction mixture. About 28 grams of distillate was obtained at 43–44° C. head temperature, 70–100° C. pot temperature and 110–120 mm. Hg pressure. This distillate was combined with the 5 grams obtained at atmospheric pressure. Chemical and infrared absorption spectrum analysis of the combined distillate (Cut 2, Table IV) showed it to be essentially pure methyl-n-butyrate (B.P. 102.8° C.), containing less than 0.01 percent boron and no detectable free hydroxyl, acid or anhydride constituents.

Distillation was stopped and the pot material (63 g.) allowed to cool to room temperature. Solids appeared in the flask at about 40° C. The reaction slurry was filtered in a dry box under nitrogen atmosphere and a small portion of the resulting boron n-butyrate solids was washed with the No. 2 distillate cut. The washed solids were then dried in a vacuum desiccator. Chemical and infrared absorption spectrum analysis of the dried boron-n-butyrate product (see Table IV) showed no detectable free hydroxyl or anhydride groups. The boron content and the mol ratio of the $OOC(CH_2)_2CH_3$ group to boron were close to the theoretical values for the $$OB_2(CH_3CH_2CH_2COO)_4$$

structure.

*Example 8.*—Preparation of boron-n-butyrate from isopropyl borate and n-butyric anhydride was carried out in the previously described equipment. A quantity (75.2 g.) isopropyl borate (99+% pure) was added to 158.2 grams of n-butyric anhydride (Tech. Grade). These reaction quantities corresponded to the stoichiometry of the following equation:

$$2(isoC_3H_7O)_3B + 5(n-C_3H_7CO)_2O \rightarrow$$
$$OB_2(n-C_3H_7COO)_4 + 6(n-C_3H_7COOC_3H_7iso)$$

The reaction mixture was then heated to a gentle reflux (103° C. head temperature, 138° C. pot temperature). Distillation was started at atmospheric pressure and 61 grams of distillate (Cut 1, Table IV) was obtained at 105–128° C. head temperature, 138–144° C. pot temperature. This distillate was found to contain only 0.018 percent boron and a trace of free hydroxyl groups. Distillation was continued at atmospheric pressure and another fraction (Cut 2—35.6 g.) was obtained at 128–129° C. head temperature and 144–150° C. pot temperature. It was found to contain 0.013 percent boron and no detectable free hydroxyl groups. Its boiling point corresponded closely to the boiling point of pure isopropyl n-butyrate (128° C.). Distillation was stopped in order to avoid excessive decomposition of pot material.

The pot residue (133.7 g.) was cooled to room temperature and the resulting solids filtered off in a dry box, using nitrogen pressure. The solids were washed with some of the Cut 2 distillate fraction and a portion of them was then dried in a vacuum desiccator at room temperature. For chemical and infrared absorption spectrum analysis of the dry sample, as well as other data pertaining to preparation of boron-n-butyrate from methyl or isopropyl borate and n-butyric anhydride, see Table IV. The dry product obtained from isopropyl borate and n-butyric anhydride was found to be free of hydroxyl and anhydride impurities.

*Example 9.*—Preparation of boron isobutyrate was carried out on laboratory-scale using methyl borate and isobutyric anhydride as raw materials. Stoichiometric quantities of reactants—41.6 grams of methyl borate and 158.2 grams of isobutyric anhydride (Tech. Grade) were mixed in the equipment previously described. The reaction mixture was heated to a gentle reflux at atmospheric pressure (68° C. head temperature, 103° C. pot temperature). The subsequent distillation was carried out at atmospheric pressure. A quantity of distillate (Cut 1, Table V, 22.8 g.) was obtained at 68–92° C. head temperature and 100–110° C. pot temperature. Analysis of this distillate fraction showed 3.9 percent boron, 0.5 percent free hydroxyl and no detectable acid or anhydride. Another distillate fraction (Cut 2, 32.5 g.) was then obtained at 92–92.5° C. head temperature, 111–130° C. pot temperature. The boron content of this fraction was found by analysis to be less than 0.01 percent. It was found to be free of hydroxyl, acid and anhydride impurities and its boiling range corresponded closely to the boiling point of pure methyl isobutyrate (92.3° C.).

The pot residue (143 g.) was cooled to room temperature. Solids appeared at about 80° C. during the cooling operation. These solids were filtered in a dry box, using nitrogen pressure, washed with a small amount of distillate (Cut 2) and dried in a vacuum desiccator. Analysis of dry solid product showed it to be 98.4 percent pure boron isobutyrate. The data, pertaining to this preparation, are listed in Table V.

*Example 10.*—Preparation of boron hexanoate (caproate) was carried out using methyl borate and n-hexanoic anhydride as starting materials.

Reaction quantities of methyl borate (10 g.) and n-hexanoic anhydride (Tech. Grade, 51.6 g.) were mixed in the previously described equipment. The quantities of starting materials corresponded to the stoichiometry of the following equation:

$$5[CH_3(CH_2)_4CO]_2O + 2(CH_3O)_3B \rightarrow$$
$$OB_2[CH_3(CH_2)_4COO]_4 + 6CH_3(CH_2)_4COOCH_3$$

Due to the high boiling nature of hexanoic anhydride (241–3° C.) and of the resultant methyl hexanoate (149–150° C.), distillation was carried out at reduced pressures in order to avoid pot material decomposition. About 4.5 grams of distillate (Cut 1) was obtained at 48° C. head temperature, 81° C. pot temperature at 14–15 mm.

Hg pressure. This fraction was found to contain a trace of hydroxyl and 0.05 percent boron. Another distillate fraction (Cut 2, 27.5 g.) was obtained at 48–49° C. head temperature, 83–97° C. pot temperature and 15–16 mm. Hg pressure. The pressure was then lowered somewhat in the system and further distillate was collected at 35° C. head temperature, 109–110° C. pot temperature and 7 mm. Hg pressure. This second distillate fraction was found to be free of hydroxyl, acid and anhydride impurities, and essentially free of boron (less than 0.01 percent B).

The boiling temperatures of these distillate fractions, at reduced pressures, were found to correspond closely to the values for methyl hexanoate, listed in "P-V-T Relationships of Organic Compounds," Dreisbach, R. R., pp. 225, 226, 3rd ed., 1952, Handbook Publishers, Inc., which are listed below:

|  | B.P.,°C. | Pressure, mm. Hg |
|---|---|---|
| Distillate: |  |  |
| Cut 1 | 48 | 14–15 |
| Cut 2 | 48 | 15 |
| Cut 2 | 35 | 7 |
| Methyl hexanoate | 47.9 | 15 |
|  | 34.2 | 7 |

About 29.5 grams of residue was obtained after distillation. This material showed signs of decomposition—brown color. No solids were found in pot residue. Analysis of pot residue sample is shown below:

| Percent B | (OOC(CH$_2$)$_4$CH$_3$) | Mol Ratio (O-hex:B) |
|---|---|---|
| 2.55 | 75.8 | 2.79 |

The calculated boron hexanoate content of the pot residue, based on boron analysis, was found to be about 59 percent. This represents a yield of about 73 percent of the theoretical. The presence of boron hexanoate was further verified by the infrared absorption spectrum analysis showing the –B–O–B– type structure.

TABLE III

*Preparation of boron propionate from methyl borate and propionic anhydride*

Reactants:
    Methyl borate (g.) _____ 41.6
    Propionic anhydride (g.) _____ 130.2
Initial reflux conditions:
    Head temperature, ° C _____ 68
    Pot temperature, ° C _____ 108
    Pressure _____ atm.
Distillation:
    Cut 1 (g.) _____ 18.5
        Head temperature, ° C _____ 68–79
        Pot temperature, ° C _____ 96–103
        Percent B _____ 5.75
    Cut 2 (g.) _____ 50.0
        Head temperature, ° C _____ 79–79.5
        Pot temperature, ° C _____ 103–115
        Percent B _____ nil
    Residue (g.) _____ 97.0
Analysis of vacuum dried product:
    Percent B _____ 5.95
    Percent OPr[1] _____ 88.3
    Mol ratio OPr:B _____ 2.2
    Percent purity[2] _____ 90.7

[1] OPr is (OOCCH$_2$CH$_3$).
[2] Based on boron analysis.

TABLE IV

*Preparation of boron-n-butyrate from n-butyric anhydride and methyl or isopropyl borates*

|  | Methyl Borate | | Isopropyl Borate |
|---|---|---|---|
| Reactants: |  |  |  |
|   Borate Ester (g.) | 24.4 | | 75.2 |
|   n-Butyric Anhydride (g.) | 93.0 | | 158.2 |
| Initial Reflux Conditions— |  |  |  |
|   Head Temperature (° C.) | 92 | | 103 |
|   Pot Temperature (° C.) | 120 | | 138 |
|   Pressure | atm. | | atm. |
| Distillation: |  |  |  |
|   Cut 1 (g.) | 16.5 | | 61 |
|     Head Temperature (° C.) | 92–102 | | 105–128 |
|     Pot Temperature (° C.) | 120–130 | | 138–144 |
|     Pressure | atm. | | atm. |
|     Boron (Percent) | 0.19 | | 0.018 |
|   Cut 2 (g.) | 5 | 28 | 35.6 |
|     Head Temp. (° C.) | 102–102.5 | 43–44 | 128–129 |
|     Pot Temp. (° C.) | 130–145 | 70–100 | 144–150 |
|     Pressure (mm. Hg) | atm. | 110–120 | atm. |
|     Boron (Percent) | 0.01 | | 0.013 |
|   Residue (g.) | 63.0 | | 133.7 |
| Analysis of Vacuum Dried Product— |  |  |  |
|   Percent B | 5.32 | | 5.53 |
|   Percent OBu[a] | 86.6 | | 88.1 |
|   Mole Ratio OBu:B | 2.02 | | 1.98 |
|   Percent Purity[b] | 94.9 | | 98.7 |

[a] OBu is (n-OOCCH$_2$CH$_2$CH$_3$).
[b] Based on boron analysis.

TABLE V

*Preparation of boron isobutyrate from methyl borate and isobutyric anhydride*

Reactants:
    Methyl borate (g.) _____ 41.6
    Isobutyric anhydride (g.) _____ 158.2
Reflux conditions:
    Head temperature (° C.) _____ 68
    Pot temperature (° C.) _____ 103
    Pressure _____ atm.
Distillation:
    Cut 1 (g.) _____ 22.8
        Head temperature (° C.) _____ 68–92
        Pot temperature (° C.) _____ 100–110
        Pressure _____ atm.
        Percent boron _____ 3.9
    Cut 2 (g.) _____ 32.5
        Head temperature (° C.) _____ 92–92.5
        Pot temperature (° C.) _____ 111–130
        Pressure _____ atm.
        Percent boron _____ 0.01
    Residue (g.) _____ 143
Analysis of vacuum dried solids:
    Percent boron _____ 5.75
    Percent OBu[1] _____ 88.8
    Mole ratio OBu:B _____ 1.92
    Percent purity[2] _____ 98.4

[1] OBu is (OOCCH(CH$_3$)$_2$).
[2] Based on OBu analysis.

In place of the borate esters used in the above, one can use any other borate ester of the lower aliphatic alcohols.

As appears in the accompanying drawing, the invention can be practiced as a continuous process, the trialkyl borate and the acetic anhydride, for example, being fed continuously into the reactor, which contains a heel composed of an equilibrium mixture of reactants and reaction products. Material is removed continuously from the reactor to a stripping column from which the alkyl ester is removed as a distillate, while the bottoms are sent to a cooler. The solid boron mixed anhydride with attendant liquid is removed from the cooler and sent to a filter on which the boron mixed anhydride is recovered. The filtrate is returned to the reactor as is

We claim:

1. A continuous process for the manufacture of a mixed anhydride of boric acid and a saturated monocarboxylic acid of the general formula $OB_2(R'COO)_4$ wherein R' is an unsubstituted alkyl group having between 1 and 7 carbons, and an acid ester of the formula R'COOR, wherein R is lower alkyl and R' is as aforestated, comprising: maintaining a mass of said acid ester and said mixed anhydride in a water-free reaction zone at about the temperature of reflux, introducing a continuous stream of a triborate ester of the general formula $B(OR)_3$, wherein R is as aforestated, into said reaction zone, introducing a continuous stream of an acid anhydride of the general formula $(R'CO)_2O$, wherein R' is as aforestated, into said reaction zone, the molar ratio of said triborate ester to said acid anhydride being about 2:5 to form said anhydride of the formula $OB_2(R'COO)_4$ and said acid ester of the formula R'COOR, continuously removing a stream of said reaction products from said reaction zone and thereafter separating said mixed anhydride and the said acid ester.

2. A process as in claim 1 wherein the tri-borate ester is that of methyl alcohol.

3. A process as in claim 1 wherein the tri-borate ester is that of ethyl alcohol.

4. A process as in claim 1 wherein the tri-borate ester is that of a propyl alcohol.

5. A process as in claim 1 wherein the tri-borate ester is that of a butyl alcohol.

6. A process as in claim 1 wherein the tri-borate ester is that of an amyl alcohol.

7. A process for the manufacture of a mixed anhydride of boric acid and of a saturated monocarboxylic acid of the general formula $OB_2(R'COO)_4$ wherein R' is an unsubstituted alkyl group having between 1 and 7 carbons, and an acid ester of the general formula R'COOR, wherein R' is as aforestated and an R is lower alkyl, comprising: reacting at about reflux temperature a tri-borate ester of the formula $B(OR)_3$, wherein R is as aforestated, and an acid anhydride of the formula $(R'CO)_2O$ wherein R' is as aforestated, the molar ratio of said triborate ester to said acid anhydride being about 2:5 to form said mixed anhydride of boric acid and of a saturated monocarboxylic acid and said acid ester and thereafter separating the said mixed anhydride and the said acid ester.

8. A process for manufacture of boron pyroacetate comprising: reacting substantially at reflux temperature substantially two moles of a tri-borate ester of methyl alcohol with substantially five moles of acetic anhydride to form boron pyroacetate, separating the boron pyroacetate from the methyl acetate formed, and recovering the boron pyroacetate.

9. A process for manufacture of boron pyroacetate comprising: reacting substantially at reflux temperature substantially two moles of a tri-borate ester of ethyl alcohol with substantially five moles of acetic anhydride to form boron pyroacetate, separating the boron pyroacetate from the ethyl acetate formed, and recovering the boron pyroacetate.

10. A process for manufacture of boron pyroacetate comprising: reacting substantially at reflux temperature substantially two moles of a tri-borate ester of a propyl alcohol with substantially five moles of acetic anhydride to form boron pyroacetate, separating the boron pyroacetate from the propyl acetate formed and recovering the boron pyroacetate.

11. A process for manufacture of boron pyroacetate comprising: reacting substantially at reflux temperature substantially two moles of a tri-borate ester of a butyl alcohol with substantially five moles of acetic anhydride to form boron pyroacetate, separating the boron pyroacetate from the butyl acetate formed, and recovering the boron pyroacetate.

12. A process for manufacture of boron pyroacetate comprising: reacting substantially at reflux temperature substantially two moles of a tri-borate ester of an amyl alcohol with substantially five moles of acetic anhydride to form boron pyroacetate, separating the boron pyroacetate from the acetate formed, and recovering the boron pyroacetate.

References Cited in the file of this patent

Cherbuiliez et al.: Helv. Chim. Acta, vol. 36, pp. 910–8 (1953).

Gerrard et al.: Chemistry and Industry, pp. 758–9 (1954).